United States Patent Office 3,409,642
Patented Nov. 5, 1968

3,409,642
1-SUBSTITUTED 9β,10α-STEROIDS OF THE ANDROSTANE SERIES
Andor Furst, Basel, and Marcel Muller, Frenkendorf, Switzerland, assignors to Hoffman-La Roche Inc., Nutley, N.J., a corporation of New Jersey
No Drawing. Filed July 14, 1966, Ser. No. 565,110
Claims priority, application Switzerland, July 19, 1965, 10,074/65
16 Claims. (Cl. 260—397.4)

ABSTRACT OF THE DISCLOSURE

This disclosure describes compounds of the class of 9β,10α-steroids of the formula

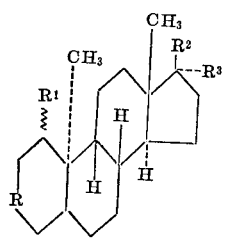

in which $R^1$ is fluorine, chlorine, bromine, cyano, alkoxy, acyloxy, alkylthio, ar-alkylthio, acetylthio, propionylthio or oxo; $R^2$, independently, is hydroxy, acyloxy, alkoxy, benzyloxy, cyclopenten-1-yloxy, 1′-ethoxycyclopentyloxy or tetrahydropyranyloxy; $R^3$, independently, is hydrogen, alkyl, alkenyl or alkynyl; $R^2$ and $R^3$ together are oxo; and R (when $R^1$ is a fluorine, chlorine, bromine, cyano, alkoxy, acyloxy, alkylthio, acetylthio or propionylthio) is a 3-keto-$\Delta^4$-,
3-keto-$\Delta^{1,4}$-,
3-keto-$\Delta^{4,6}$-,
3-keto-$\Delta^{1,4,6}$-,
3-acyloxy-$\Delta^{3,5}$- or a
3-acyloxy-$\Delta^{2,4,6}$-system or (when $R^1$ is oxo) a 3-keto-$\Delta^4$-,
3-keto-$\Delta^{4,6}$-,
3-acyloxy-$\Delta^{3,5}$-or a
3-acyloxy-$\Delta^{2,4,6}$-system.

The compounds are pharmaceutically useful as hormonal or antihormonal agents.

---

The invention relates to novel 9β,10α-steroids of the formula

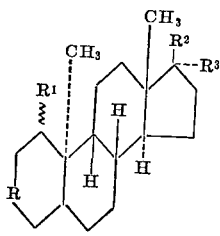

I in which $R^1$ is fluorine, chlorine, bromine, cyano, alkoxy, acyloxy, alkylthio, ar-alkylthio, acetylthio, propionylthio or oxo; $R^2$, independently, is hydroxy, acyloxy, alkoxy, benzyloxy, cyclopenten-1-yloxy, 1′-ethoxycyclopentyloxy or tetrahydropyranyloxy; $R^3$, independently, is hydrogen, alkyl, alkenyl or alkynyl; $R^2$ and $R^3$ together are oxo; and R (when $R^1$ is a fluorine, chlorine, bromine, cyano, alkoxy, acyloxy, alkylthio, acetylthio or propionylthio) is a 3-keto-$\Delta^4$-,
3-keto-$\Delta^{1,4}$-,
3-keto-$\Delta^{4,6}$-,
3-keto-$\Delta^{1,4,6}$-,
3-acyloxy-$\Delta^{3,5}$- or a
3-acyloxy-$\Delta^{2,4,6}$-system or (when $R^1$ is oxo) a 3-keto-$\Delta^4$-,
3-keto-$\Delta^{4,6}$-,
3-acyloxy-$\Delta^{3,5}$-or a
3-acyloxy-$\Delta^{2,4,6}$-system.

An acyloxy group represented by the symbols $R^1$ and $R^2$, as well as a 3-acyloxy group, preferably contains the acid residue of a saturated or unsaturated aliphatic, cycloaliphatic, araliphatic or aromatic carboxylic acid having 1–20 carbon atoms. Examples of such acids are: formic acid, acetic acid, pivalic acid, propionic acid, butyric acid, caproic acid, enanthic acid, palmitic acid, stearic acid, succinic acid, malonic acid, benzoic acid.

An alkoxy or alkylthio group represented by the symbol $R^1$ or an alkoxy group represented by the symbol $R^2$ preferably contains 1–10 carbon atoms. Examples of such groups are methoxy, ethoxy, propoxy, tertbutoxy, cyclopentyloxy, cyclohexyloxy or methylthio, ethylthio, propylthio, tertbutythio, cyclopentylthio or cyclohexylthio.

The alkyl, alkenyl and alkynyl groups represented by the symbol $R^3$ preferably contain 1–5 carbon atoms. Examples of such groups are methyl, ethyl, propyl, isopropyl, butyl, isobutyl, amyl, vinyl, allyl, 1′- and 2′-methallyl, ethynyl and propargyl. An ar-alkyl group is, for example, a phenyl-alkyl group where alkyl has the meaning given above. Such a group is, for example, benzyl.

Exemplary 9β,10α-steroids of Formula I are:

1β-acetylthio-17α-methyl-17β-hydroxy-9β,10α-androsta-4,6-dien-3-one,
1β-acetylthio-17α-methyl-17β-acetoxy-9β,10α-androsta-4,6-dien-3-one,
1β-acetylthio-17α-methyl-17β-hydroxy-9β,10α-androst-4-en-3-one,
1β-propionylthio-17α-methyl-17β-hydroxy-9β,10α-androsta-4,6-dien-3-one,
1β-acetylthio-17β-hydroxy-9β,10α-androsta-4,6-dien-3-one,
1β-propionylthio-17β-hydroxy-9β,10α-androsta-4,6-dien-3-one,
1β-ethylthio-17α-methyl-17β-hydroxy-9β,10α-androsta-4,6-dien-3-one,
1β-ethylthio-17α-methyl-17β-acetoxy-9β,10α-androsta-4,6-dien-3-one,
1β-ethylthio-17α-methyl-17β-hydroxy-9β,10α-androst-4-en-3-one,
1β-methylthio-17α-methyl-17β-hydroxy-9β,10α-androsta-4,6-dien-3-one,
1β-benzylthio-17α-methyl-17β-hydroxy-9β,10α-androsta-4,6-dien-3-one,
1β-cyano-17α-methyl-17β-acetoxy-9β,10α-androsta-4,6-dien-3-one,
1β-cyano-17α-methyl-17β-acetoxy-9β,10α-androst-4-en-3-one,
1-cyano-17α-methyl-17β-acetoxy-9β,10α-androsta-1,4,6-trien-3-one,
1β,17β-diacetoxy-9β,10α-androsta-4,6-dien-3-one,
1β,17β-diacetoxy-17α-methyl-9β,10α-androsta-4,6-dien-3-one,
1β,17β-diacetoxy-17α-methyl-9β,10α-androst-4-en-3-one, 1β-acetoxy-17α-methyl-17β-hydroxy-9β,10α-androsta-4,6-dien-3-one,
17β-hydroxy-9β,10α-androsta-4,6-diene-1,3-dione,
17α-methyl-17β-hydroxy-9β,10α-androsta-4,6-diene-1,3-dione,
1,17β-diacetoxy-9β,10α-androsta-1,4,6-trien-3-one,
1ξ,17β-diacetoxy-17α-methyl-9β,10α-androsta-4,6-dien-3-one,
1ξ-methoxy-17β-hydroxy-9β,10α-androsta-4,6-dien-3-one,
1-methoxy-17β-hydroxy-9β,10α-androsta-1,4,6-trien-3-one,
1ξ-methoxy-17α-methyl-17β-hydroxy-9β,10α-androst-4-en-3-one,
1ξ-methoxy-17α-methyl-17β-hydroxy-9β,10α-androsta-4,6-dien-3-one,
1-methoxy-17α-methyl-17β-hydroxy-9β,10α-androsta-1,4,6-trien-3-one,
1ξ,17β-di-tetrahydropyranyloxy-17α-methyl-9β,10α-androsta-4,6-dien-3-one,
1ξ-chloro-17β-acetoxy-9β,10α-androsta-4,6-dien-3-one,
1-chloro-17β-acetoxy-9β,10α-androsta-1,4,6-trien-3-one,
1ξ-chloro-17α-methyl-17β-acetoxy-9β,10α-androsta-4,6-dien-3-one,
1-chloro-17α-methyl-17β-acetoxy-9β,10α-androsta-1,4,6-trien-3-one,
1ξ-bromo-17α-methyl-17β-acetoxy-9β,10α-androsta-4,6-dien-3-one.

A preferred group of compounds of Formula I are those wherein $R^1$ is fluorine, chlorine, bromine, alkoxy, acyloxy, alkylthio, ar-alkylthio, acetylthio, propionylthio or oxo and R, $R^2$ and $R^3$ have the meaning given above.

The novel 9β,10α-steroids of Formula I can be obtained according to methods which are known per se from the chemistry of steroids of normal (i.e., 9α,10β) configuration.

The introduction of a 1-cyano group can, for example, be achieved by addition of hydrogen cyanide at the $\Delta^1$-double bond of a 3-keto-$\Delta^{1,4}$- or 3-keto-$\Delta^{1,4,6}$-9β,10α-steroid, especially one of the formula

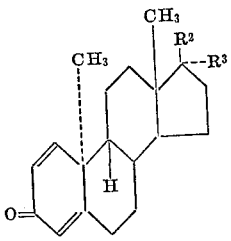

II in which $R^2$ and $R^3$ have the same meanings as above, or a 6-dehydro-derivative thereof, by means of alkali cyanides (such as potassium cyanide) in preferably polar organic solvents (such as alcohols, dioxan or dimethylformamide) at elevated temperature (e.g., reflux temperature) (see U.S. Patents Nos. 3,088,952 and 3,054,809). The 1-cyano group can, moreover, be introduced with hydrogen cyanide formed in situ; for example, by treatment of the foregoing 9β,10α-steroids of Formula II with acetone cyanhydrin in the presence of a base (e.g., an alkali hydroxide or carbonate) preferably with heating (e.g., at reflux temperature) (see Bull. Soc. Chim. France 1963, 2471).

By reaction of 3-keto-$\Delta^{1,4}$- or 3-keto-$\Delta^{1,4,6}$-9β,10α-steroids, especially those of Formula II, with alkylmercaptans or ar-alkylmercaptans, there are obtained 1-alkyl or 1-alkylthio-3-keto-$\Delta^4$-9β,10α-steroids or 6-dehydro-derivatives thereof; by reaction with thioacetic acid or thiopropionic acid, the corresponding 1-acetylthio or 1-propionylthio compounds are obtained [see Chem. Ber. 96, 10 (1963); J. Org. Chem. 24, 277 (1959) and 27, 2693 (1962) as well as J. Am. Chem. Soc. 81, 1224 (1957)].

These reactions can be carried out using the mercaptan or the thioacid as a solvent or they can be carried out in the presence of other solvents (e.g., aromatic hydrocarbons such as benzene or ethers such as dioxan) at temperatures above or below room temperature, preferably between about 0° C. and about 80° C. The reactions can if desired, be performed in the presence of a catalyst (e.g., piperidine or hydrochloric acid).

For the preparation of 9β,10α-steroids of Formula I in which $R^1$ represents an acyloxy, alkoxy, fluorine, chlorine or bromine, the 1-hydroxy group of a 1-hydroxy-3-keto-$\Delta^4$-9β,10α-steroid or 6-dehydro-derivative thereof is conveniently esterified or etherified or, in free or esterified form, substituted by the named halogen atoms.

The esterification and the etherification of the 1-hydroxy group can be effected according to methods known per se; for example, by treatment with an acylating agent (e.g., an acid anhydride such as acetic anhydride) in the presence of a base such as pyridine. The etherification can, for example, be effected with an alkyl halide such as methyl or ethyl iodide in the presence of a base such as methanolic caustic potash.

The substitution of a 1-hydroxy or 1-acyloxy group by a fluorine, chlorine or bromine atom can, for example, be effected by treating a correspondingly substituted 9β,10α-steroid, especially a 1-hydroxy- or 1-acyloxy-3-keto-$\Delta^4$-9β,10α-steroid or 6-dehydro-derivative thereof, with hydrogen fluoride, chloride or bromide. This reaction is preferably undertaken at room temperature (e.g., 20–25° C.) in a non-ketonic, non-alcoholic, inert organic solvent (e.g., in aliphatic or aromatic hydrocarbons such as petroleum ether or benzene, toluene or xylene, or in halogenated hydrocarbons such as methylene chloride, chloroform, carbon tetrachloride or chlorobenzene, in nitrated hydrocarbon such as nitrobenzene or in ethers such as diethyl ether, dioxan or tetrahydrofuran).

The hydrogen fluoride, chloride or bromide is conveniently led as the dry gas into a solution of the 1-hydroxy- or 1-acyloxy-3-keto-$\Delta^4$-9β,10α-steroid or 6-dehydro-derivative thereof in one of the named solvents, conveniently for a period of time from about ½ hour to about 10 hours. In doing this, the course of the reaction can be followed by thin layer chromatography or measurement of the UV-absorption spectrum of the reaction mixture.

A 1-hydroxy-9β,10α-steroid can be prepared by reaction of a 3-hydroxy-$\Delta^1$-9β,10α-steroid with N-bromo-succinimide in the presence of perchloric acid in tertbutanol and catalytic hydrogenation of the so-formed 3-keto-1-hydroxy-2-bromo-9β,10α-steroid intermediate or by addition of hypobromic acid at the $\Delta^1$-double bond of a 3-keto-$\Delta^1$-9β,10α-steroid and subsequent catalytic hydrogenation of the so-formed bromohydrin intermediate, as above (see J. Chem. Soc., 1959, 4136).

A 1-halo-, especially a 1-chloro-3-keto-$\Delta^1$-,$\Delta^{1,4}$- or $\Delta^{1,4,6}$-9β,10α-steroid, can also be prepared by reaction of a 1,3-diketo-9β,10α-steroid, or 4-dehydro or 4,6-bisdehydro-derivative thereof, with an acid halide, especially an acid chloride such as oxalyl chloride, sulphuryl chloride or phosphorus oxychloride.

A preferred method for the introduction of a 1-acyloxy or 1-alkoxy group or a 1-fluorine, 1-chlorine or 1-bromine atom consists in splitting off the epoxide ring of a 1,2-epoxy-9β,10α-steroid, especially one of the formula

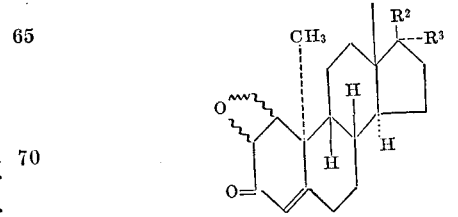

III in which $R^2$ and $R^3$ have the same meaning as above, or 6-dehydro-derivative thereof, by treatment with a reducing agent, reoxidizing a simultaneously formed 3-hydroxy group to the 3-keto group, and then esterifying, etherifying or substituting, for a 1-hydroxy or 1-acyloxy group, a fluorine, chlorine or bromine atom as described above. The splitting off of the 1,2-epoxide ring can, for example, be effected with lithium in liquid ammonia [see South African Patent No. 63/5165] or with lithium aluminum hydride. The reoxidation of a 3-hydroxy group to the 3-keto group can be effected by means of manganese dioxide in glacial acetic or chloroform. If the reoxidation described hereinbefore (i.e., the oxidation of the 1,3-dihydroxy-$\Delta^4$-, or $\Delta^{4,6}$-grouping) is carried out with stronger oxidation agents (e.g., chromic acid in glacial acetic or in dimethylformamide), there are obtained 1,3-diketo-$\Delta^4$- or $\Delta^{4,6}$-9$\beta$,10$\alpha$-steroids.

The manufacture of the 1,2-epoxy-steroids of Formula III or 6-dehydro-derivatives thereof is conveniently effected by treatment of 9$\beta$,10$\alpha$-steroids of Formula II or 6-dehydro-derivatives thereof with hydrogen peroxide in the presence of alkali (see U.S. application Serial No. 565,093 filed of even date herewith).

Compounds of Formula I in which $R^1$ exhibits $\beta$-configuration can be rearranged into the corresponding compounds in which $R^1$ has $\alpha$-configuration by a reaction sequence of halogenation, 1,2-dehydrohalogentation and hydrogenation. Thus, for example, a 1$\beta$-cyano-3-keto-9$\beta$,10$\alpha$-steroid can be converted by treatment with bromine in glacial acetic into a 1$\beta$-cyano-2-bromo-3-keto - 9$\beta$,10$\alpha$-steroid, the latter transformed with dehydrohalogenation agents (such as pyridine) into a 1-cyano-$\Delta^1$-3-keto-9$\beta$,10$\alpha$-steroid and this catalytically hydrogenated (e.g., with noble metals such as palladium) to a 1$\alpha$-cyano-3-keto-9$\beta$,10$\alpha$-steroid.

In the compounds of Formula I obtained as described above, double bonds can be introduced, insofar as they are not already present, into the 1- and/or 6-position. Compounds of Formula I in which R represents a 3-keto-$\Delta^4$- or $\Delta^{4,6}$-system can be converted into 3-acyloxy-$\Delta^{3,5}$- or $\Delta^{2,4,6}$-9$\beta$,10$\alpha$-steroids.

For these reaction steps, the methods known from the chemistry of the normal sterioids can be used.

The enol-esterification can, for example, be effected by treatment with an acylating agent in the presence of a catalyst (e.g., with isopropenyl acetate in the presence of p-toluenesulphonic acid).

The introduction of double bonds in the 1- and/or 6-position can, for example, be effected by treatment with dehydrogenation agents such as chloranil or 2,3-dichloro-5,6-dicyano-benzoquinone. A $\Delta^1$-double bond can be introduced with iodine pentoxide, periodic acid, selenium dioxide, lead tetraacetate, in a microbiological manner or by a reaction sequence of halogenation and dehydrohalogenation.

The compounds of this invention of Formula I are pharmaceutically useful by virtue of their hormonal or antihormonal activity. Thus, certain of the compound of Formula I are useful as anabolic agents. Certain of the compounds of Formula I are also useful as androgenic and/or antigonadotropic agents. The compounds having a 1-acetylthio substituent are particularly useful by virtue of their high anabolic/androgenic ratio. The compounds of Formula I can be used in the form of conventional pharmaceutical preparations which contain said compounds in admixture with conventional pharmaceutical organic or in organic inert carrier materials suitable for internal administration. The pharmaceutical compositions containing the compounds of Formula I can be administered parenterally or orally. Dosage can be adjusted to individual requirements. The pharmaceutical compositions can contain such conventional organic or inorganic inert carrier materials such as water, gelatin, lactose, starch, magnesium stearate, talc, vegetable oils, gums, polyalkylene glycols, Vaseline or the like. The pharmaceutical preparations can be in conventional solid forms such as tablets, dragées, suppositories capsules or in conventional liquid forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials.

The following examples are illustrative but not limitative of this invention. All temperatures are stated in degrees centigrade.

Example 1

A solution of 0.5 g. of 17$\alpha$-methyl-17$\beta$-hydroxy-9$\beta$,10$\alpha$-androsta-1,4,6-trien-3-one in 15 ml. of thioacetic acid was heated at 50° for 15 minutes. The reaction mixture was then cooled and concentrated in vacuo yielding a residue which was chromatographed on silica gel. The benzene/acetone (96:4) eluates yielded pure, amorphous 1$\beta$-acetylthio-17$\alpha$-methyl-17$\beta$-hydroxy - 9$\beta$,10$\alpha$-androsta-4,6 - dien-3-one. $[\alpha]_D^{25°}=-392°$ (dioxane). UV: $\lambda$max. 290 m$\mu$/$\epsilon$=21,000, 230 m$\mu$/$\epsilon$=7,500. This compound is useful as an androgenic and anabolic agent.

Example 2

According to the process described in Example 1, from 17$\alpha$-methyl-17$\beta$-acetoxy-9$\beta$,10$\alpha$-androsta - 1,4,6 - trian - 3-one there was obtained 1$\beta$ -acetylthio - 17$\alpha$ - methyl-17$\beta$-acetoxy-9$\beta$,10$\alpha$-androsta-4,6-dien-3-one. $[\alpha]_D^{25°}=-422°$ (dioxane). UV: $\lambda$max. 290 m$\mu$/$\epsilon$=23,800, 28 m$\mu$/$\epsilon$=7,200. This compound is useful as an androgenic, anabolic and antigonadotropic agent.

Example 3

A solution of 7.0 g. of 17$\alpha$-methyl-17$\beta$-hydroxy-9$\beta$,10$\alpha$-androsta-1,4,6-trien-3-one and 11 ml. of piperidine in 100 ml. of ethyl mercaptan was heated at reflux for 45 minutes. The reaction mixture was evaporated to dryness in vacuo and the residue chromatographed on silica gel. The (petroleum ether)/ether (1:3) eluates yielded 1$\beta$-ethylthio-17$\alpha$-methyl-17$\beta$-hydroxy - 9$\beta$,10$\alpha$ - androsta-4,6-dien-3-one, melting point: 126–127° (recrystallized from ether). $[\alpha]_D^{25°}=-495°$ (dioxane). UV: $\lambda$max. 284 m$\mu$/$\epsilon$=21,400. This compound is useful as an anabolic and antigonadotropic agent.

Example 4

According to the process described in Example 3, from 17$\alpha$ - methyl - 17$\beta$ - acetoxy - 9$\beta$,10$\alpha$ - androsta - 1,4,6-trien-3-one there was obtained 1$\beta$-ethylthio-17$\alpha$-methyl-17$\beta$-acetoxy-9$\beta$,10$\alpha$-androsta - 4,6 - dien - 3 - one. Melting point: 165–167° (recrystallized from acetone/hexane). $[\alpha]_D^{25°}=-424°$ (dioxane). UV: $\lambda$max. 282 m$\mu$/$\epsilon$=20,900. This compound is useful as an androgenic, anabolic and antigonadotropic agent.

Example 5

A mixture of 5.0 g. of 17$\alpha$-methyl-17$\beta$-acetoxy-9$\beta$,10$\alpha$-androsta-1,4,6-trien-3-one, 2 ml. of acetone cyanhydrin, 10 ml. of tetrahydrofuran, 100 ml. of methanol and 5 ml. of saturated aqueous sodium carbonate solution was heated to reflux under a nitrogen atmosphere for 2½ hours. The reaction mixture was then cooled, poured on ice-water and extracted with ether. The ether extracts were washed neutral with water, dried with sodium sulfate and evaporated. The residue was chromatographed on silica gel with (methylene chloride)/acetone (98:2) yielding 1$\beta$ - cyano - 17$\alpha$ - methyl - 17$\beta$ - acetoxy-9$\beta$,10$\alpha$-androsta - 4,6 - dien-3-one. Melting point 245–247° [from acetone/(isopropyl ether)] $[\alpha]_D^{25°}=-518°$ (dioxane). UV: $\lambda$max. 286 m$\mu$/$\epsilon$=24,350.

Example 6

A solution of 0.5 g. of 1$\beta$,2$\beta$-epoxy-17$\alpha$-methyl-17$\beta$-hydroxy-9$\beta$,10$\alpha$-androsta-4,6-dien-3-one in 50 ml. of absolute ether was added to a solution of 0.5 g. of lithium aluminum hydride in 20 ml. of absolute ether. The mixture was stirred for 1 hour at room temperature, then carefully treated with 2 ml. of saturated sodium sulfate solution. The resultant granular precipitate was filtered off and the filtrate evaporated to dryness. The so-obtained crude 1β,3ξ,17β - trihydroxy-17α-methyl-9β,10α-androsta-4,6-diene was dissolved in 50 ml. of chloroform and treated with 3.0 g. of manganese dioxide. The mixture was stirred at room temperature for 1 hour. The manganese dioxide was then filtered off and the filtrate evaporated to dryness. There was thus obtained 0.5 g. of crystals which were twice recrystallized from ether yielding pure 1β,17β-dihydroxy - 17α - methyl-9β,10α-androsta-4,6-dien-3-one, melting point 196–197°. UV: λmax. 288 mμ/ε=24,200

The above-utilized starting material can be prepared as follows:

A solution of 1.0 g. of 17α-methyl-17β-hydroxy-9β,10α-androsta-1,4,6-trien-3-one in 20 ml. of methanol was treated at 0° with 1 ml. of 10% caustic soda and 2 ml. of 30% hydrogen peroxide and then maintained at 0° for 3 hours. The mixture was then neutralized with acetic acid, poured on ice water and extracted with methylene chloride. The methylene chloride extracts (washed neutral with water) were dried with sodium sulfate and the solvent evaporated in vacuo. The resultant residue was then chromatographed on silica gel. The ether/petroleum ether (1:1) eluates, pure according to thin layer chromatogram, were combined and recrystallized from methylene chloride/isopropyl ether yielding 1β,2β-epoxy-17α-methyl-17β-hydroxy-9β,10α-androsta-4,6-diene - 3 - one, melting point 160°. [α]$_D^{25°}$=—760°. UV: λmax. 293 mμ/ε=20,000.

Example 7

2.0 ml. of acetyl chloride in 25 ml. of dry benzene was added within 10 minutes to a solution of 2.0 g. of 1β,17β-dihydroxy-17α-methyl-9β,10α-androsta-4,6-dien-3-one in 50 ml. of dry pyridine at 0° C. The reaction mixture was stirred for 2 hours at 0° C. and then for 20 hours at 20° C., poured into a mixture of ice and diluted hydrochloric acid and extracted with methylene chloride. The extract was washed with water until neutral, dried and evaporated in vacuo. The residue was chromatographed on a 50 fold amount of silica gel using ethyl acetate petroleum ether (3:1) as the eluting agent. The first fractions afforded pure, amorphous 1β,17β-diacetoxy - 17α - methyl-9β,10α-androsta-4,6-dien-3-one, [α]$_D^{25}$=—427° (in dioxan); the following fractions gave pure, amorphous 1β-acetoxy-17α-methyl - 17β - hydroxy - 9β,10α - androsta-4,6-dien-3-one, [α]$_D^{25}$=—513° (in dioxan). This compound is useful as an anabolic and antigonadotropic agent.

Example 8

A mixture of 4.0 g. of 17α-methyl-17β-hydroxy-9β,10α-androsta-1,4,6-trien-3-one and 80 ml. of thiopropionic acid was kept for 10 minutes at 25° C. The reaction mixture was processed as described in Example 1 and chromatographed on silica gel. The ether-petroleum ether (2:1) fractions afforded pure, amorphous 1β-propionylthio-17α-methyl - 17β - hydroxy - 9β,10α - androsta-4,6-dien-3-one, [α]$_D^{25}$=—469° (in dioxan). UV: λmax. 230 mμ/ε=7400, 292 mμ/ε=22,700. This compound is useful as an androgenic, anabolic and antigonadotropic agent.

Example 9

0.5 g. of 17α-methyl-17β-hydroxy-9β,19α-androsta-1,4,6-trien-3-one was dissolved in 5 ml. of methyl mercaptan at —20° C. The solution was kept for 2 hours at —20° C. and then concentrated in vacuo. The residue was chromatographed on 20 g. of silica gel. Elution with ether gave pure 1β-methylthio-17α-methyl-17β-hydroxy-9β,10α-androsta-4,6-dien-3-one, melting point 164–166° (from methylene chloride-isopropyl ether); [α]$_D^{25}$=—457°; UV: λmax. 284.5 mμ/ε=20,000. This compound is use-ful as an androgenic, anabolic and antigonadotropic agent.

Example 10

A mixture of 2.5 g. of 17α-methyl-17β-hydroxy-9β,10α-androsta-1,4,6-trien-3-one, 35 ml. of isopropyl mercaptan and 4 ml. of piperidine was refluxed from 70 minutes. The excess of isopropyl mercaptan was evaporated in vacuo and the residue was chromatographed on silica gel. The ether-petroleum ether (1:1) eluates afforded pure 1β-isopropylthio - 17α - methyl - 17β - hydroxy-9β,10α-androsta-4,6-dien-3-one, melting point 164–166° (from methylene chloride-isopropyl ether); [α]$_D^{25}$=—457°; UV; λmax. 284.5 mμ/ε=20,000. This compound is useful as an androgenic, anabolic and antigonadotropic agent.

Example 11

A mixture of 4.0 g. of 17α-methyl-17β-hydroxy-9β,10α-androsta-1,4,6- trien-3-one, 400 ml. of pyridine, 4 ml. of benzene and 8 ml. of benzyl mercaptan was kept for 15 minutes at 25° C. After the usual work-up there was obtained 1β-benzylthio-17α-methyl-17β-hydroxy-9β,10α-androsta-4,6-dien-3-one, melting point 88–90° (from ether). [α]$_D^{25}$=—433°, UV; λmax. 283 mμ/ε=20,500. This compound is useful as an androgenic, anabolic and antigonadotropic agent.

Example 12

Tablets of the following formulations were prepared:

A

| | Mg. |
|---|---|
| 1β-acetylthio - 17α - methyl-17β-hydroxy-9β,10α-androsta-4,6-dien-3-one | 1 |
| Lactose | 75 |
| Corn starch | 72.5 |
| Talc | 1.35 |
| Magnesium stearate | 0.15 |
| | 150.00 |

B

| | Mg. |
|---|---|
| 1β-acetylthio - 17α - methyl-17β-acetoxy-9β,10α-androsta-4,6-dien-3-one | 1 |
| Lactose | 75 |
| Corn starch | 72.5 |
| Talc | 1.35 |
| Magnesium stearate | 0.15 |
| | 150.00 |

What is claimed is:
1. A compound of the formula

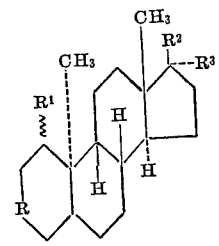

in which R¹ is fluorine, chlorine, bromine, cyano, alkoxy having up to 10 carbon atoms, acyloxy having up to 20 carbon atoms, alkylthio having up to 10 carbon atoms, phenyl-alkylthio wherein the alkyl moiety has up to 10 carbon atoms, acetylthio, propionylthio or oxo; R², independently, is a hydroxy, acyloxy having up to 20 carbon atoms, alkoxy having up to 10 carbon atoms, benzyloxy, cyclopenten-1-yloxy, 1'-ethoxycyclopentyloxy or tetrahydropyranyloxy; R³, independently, is hydrogen, alkyl having up to 5 carbon atoms, alkenyl having up to 5 carbon atoms or alkynyl having up to 5 carbon atoms; R² and R³ together are oxo; and R (when R¹ is fluorine, chlorine, bromine, cyano, alkoxy, having up to 10 carbon atoms, acyloxy having up to 20 carbon atoms, alkylthio, acetylthio or propionylthio) is a 3-keto-Δ⁴-,
3-keto-Δ¹,⁴-,
3-keto-Δ⁴,⁶-,
3-keto-Δ¹,⁴,⁶-,
3-acyloxy-Δ³,⁵- or a
3-acyloxy-Δ²,⁴,⁶-system or (when R¹ is oxo) a 3-keto-Δ⁴-,
3-keto-Δ⁴,⁶-,
3-acyloxy-Δ³,⁵- or a
3-acyloxy-Δ²,⁴,⁶-system.

2. A compound as in claim 1 wherein R¹ is β-acetylthio.

3. A compound as in claim 2 which is 1β-acetylthio-17α-methyl-17β-hydroxy-9β,10α-androsta-4,6-dien-3-one.

4. A compound as in claim 2 which is 1β-acetylthio-17α-methyl-17β-acetoxy-9β,10α-androsta-4,6-dien-3-one.

5. A compound as in claim 1 which is 1β-ethylthio-17α-methyl-17β-hydroxy-9β,10α-androsta-4,6-dien-3-one.

6. A compound as in claim 1 which is 1β-ethylthio-17α-methyl-17β-acetoxy-9β,10α-androsta-4,6-dien-3-one.

7. A compound as in claim 1 which is 1β-cyano-17α-methyl-17β-acetoxy-19β,10α-androsta-4,6-dien-3-one.

8. A compound as in claim 1 which is 1β-acetoxy-17α-methyl-17β-hydroxy-9β,10α-androsta-4,6-dien-3-one.

9. A compound as in claim 1 which is 1β-propionylthio-17α-methyl-17β-hydroxy-9β,10α-androsta-4,6-dien-3-one.

10. A compound as in claim 1 which is 1β-methylthio-17α-methyl-17β-hydroxy-9β,10α-androsta-4,6-dien-3-one.

11. A compound as in claim 1 which is 1β-isopropylthio - 17α-methyl - 17β-hydroxy - 9β,10α-androsta - 4,6-dien-3-one.

12. A compound as in claim 1 which is 1β-benzylthio-17α-methyl-17β-hydroxy-9β,10α-androsta-4,6-dien-3-one.

13. A compound as in claim 1 wherein R³ is alkyl having up to 5 carbon atoms.

14. A compound as in claim 1 wherein R³ is alkenyl having up to 5 carbon atoms.

15. A compound as in claim 1 wherein R³ is alkynyl having up to 5 carbon atoms.

16. A compound as in claim 1 wherein R¹ has a β stereo-configuration.

References Cited

UNITED STATES PATENTS

| | | | |
|---|---|---|---|
| 2,875,215 | 2/1959 | Dodson | 260—397.3 |
| 3,198,792 | 8/1965 | Reerink et al. | 260—239.55 |

LEWIS GOTTS, *Primary Examiner.*

E. G. LOVE, *Assistant Examiner.*

UNITED STATES PATENT OFFICE
CERTIFICATE OF CORRECTION

Patent No. 3,409,642                                              November 5, 1968

Andor Furst et al.

It is certified that error appears in the above identified patent and that said Letters Patent are hereby corrected as shown below:

Column 5, line 25, "dehydrohalogentation" should read -- dehydrohalogenation --; line 64, "in organic" should read -- inorganic --. Column 6, line 29, "m$\mu$/$\epsilon$=23,800, 28" should read -- m$\mu$/$\epsilon$=23,800, 228 --. Column 7, line 67, "9$\beta$,19$\alpha$" should read -- 9$\beta$,10$\alpha$ --. Column 8, line 7, "from" should read -- for --; line 11, cancel "androsta", second occurrence; lines 11 to 13, "164-166° (from methylene-chloride-isopropyl ether;) [$\alpha$]$_D$25= 457°; UV; $\lambda$max. 284.5 m$\mu$/$\epsilon$=20,000" should read -- 112-114° (from ether-isopropyl ether); [$\alpha$]$_D$25=-489°; UV: $\lambda$max. 284 m$\mu$/$\epsilon$= 21,000 --; line 24, "UV;" should read -- UV: --. Column 9, line 28, "19$\beta$,10$\alpha$" should read -- 9$\beta$,10$\alpha$ --.

Signed and sealed this 7th day of April 1970.

(SEAL)
Attest:

EDWARD M. FLETCHER, JR.                         WILLIAM E. SCHUYLER, JR.
Attesting Officer                                    Commissioner of Patents